United States Patent [19]

Thomas, Jr.

[11] Patent Number: 4,785,569
[45] Date of Patent: Nov. 22, 1988

[54] FISHING LURE AND LURE RETAINING DEVICE

[76] Inventor: Cecil L. Thomas, Jr., 16818 Swanmore, Humble, Tex. 77396

[21] Appl. No.: 96,465

[22] Filed: Sep. 14, 1987

[51] Int. Cl.⁴ .............................................. A01K 85/00
[52] U.S. Cl. ................................. 43/42.31; 43/42.24; 43/42.22
[58] Field of Search ................. 43/42.31, 42.08, 42.22, 43/42.24, 42.23, 42.26

[56] References Cited

U.S. PATENT DOCUMENTS

| | | | |
|---|---|---|---|
| 1,870,559 | 8/1932 | Drake | 43/42.22 |
| 2,999,329 | 9/1961 | Pankuch | 43/42.31 |
| 3,091,049 | 5/1963 | Reimer | 43/42.31 |
| 3,521,394 | 7/1970 | Wintersberger | 43/42.08 |
| 3,760,528 | 9/1973 | Moore | 43/42.24 |
| 3,831,307 | 8/1974 | Pittman | 43/42.31 |

Primary Examiner—Kurt Rowan
Attorney, Agent, or Firm—Browning, Bushman, Zamecki & Anderson

[57] ABSTRACT

A fishing lure with an improved lure retaining device is provided for securely fastening a pliable-type lure body to a fishing hook after the lure body is pressed over the hook. A rigid pin member having a stop at one end is pushed through the lure body and through the eye of the hook. An attachable and detachable retainer is connected to the other end of the rigid pin member, thereby preventing the pin from falling out of the hook eye, and also preventing the lure body from moving along the shank of the hook. The retaining device may have a water-tight interior cavity to provide a desired bouyancy for the lure, and to accommodate a plurality of ball members sealed within the cavity which create noise and thereby attract fish as the lure is pulled through the water.

18 Claims, 1 Drawing Sheet

FISHING LURE AND LURE RETAINING DEVICE

FIELD OF THE INVENTION

The present invention relates to an improved fishing device and, more particularly, to an improved fishing device of the type utilizing a pliable lure body and a hook.

DESCRIPTION OF THE PRIOR ART

Many types of artificial lures have been designed to attract and hook fish or other aquatic animals. One of the more popular types of artificial lures is manufactured from natural or synthetic rubber or plastic materials shaped and colored to represent natural foods, such as worms, lizards, or other insects. These lures are typically "threaded" onto a conventional hook in a manner which covers at least a portion of the hook (generally the hook shank portion) so that the hook barb is properly positioned to catch the fish.

Positioning of these pliable-type lure bodies to the hook has long been a troublesome problem. Most fishermen use only the hook itself to secure the lure body to the hook, which frequently allows the lure body to move axially along the shank of the hook as it progresses through the water, thereby causing the lure to "ball up" on the hook, thus changing the natural appearance of the lure.

One crude method of securing the pliable lure body to the hook involves pushing a portion of a toothpick through a portion of the lure, then through the eye of the hook, and finally through an opposing portion of the lure body. This technique does not provide an effective solution, however, since the toothpick is not adequately retained and therefore can work its way back or through the lure body and out of engagement with the hook eye.

Additional problems with prior art fishing lures relate to the poor bouyancy of the lure in water, their inability to effectively act as a casting weight, and their poor ability to attract certain types of fish. To improve the bouyancy of the lure, some fishermen place small floats adjacent the lure. These floats are insufficient to cause the lure to float naturally in the water, yet provide additional buoyancy to the fishing line and thus the lure connected thereto. These floats, of course, also detract from the natural appearance of the lure.

Most fishermen attach weights, generally manufactured from lead, to the fishing line adjacent the hook to assist in casting. These weights, since they are generally physically separated somewhat from the lure, create additional casting problems for the fishermen with respect to tree limbs and other naturally occurring obstacles. Although small metallic balls have been placed within artificial worms or lures to create noise and thereby attract fish as the lures move through the water, these devices are relatively expensive and do not solve the other previously mentioned problems.

The disadvantages of the prior art are overcome by the present invention, and an improved fishing lure is provided of the type utilizing a pliable lure body and fishing hook.

SUMMARY OF THE INVENTION

A principal advantage of the present invention resides in the retaining device for securing the pliable lure body to the hook. A rigid pin member has a stop or retaining means attached at one end thereof, which may be shaped and designed to look to the fish like an eye of the lure. The other end of the rigid pin member is designed to be attached to a similar stop or retaining means. One or both retaining means can be repeatedly attachable and detachable from the pin member, so that the retaining means can be used with various pliable fishing lure bodies.

In practice, the pin member with a fixed eye-like stop at one end thereof may be pressed through the lure at a position aligned with the eye of the hook. A detachable eye-like retainer is then temporarily attached to the pointed end of the protruding pin, thereby retaining the pin at its position through both the lure body and the eye of the hook, and also retaining the lure body on the hook.

A further improvement of the fishing device according to the present invention resides in the construction and function of the stop and retainer. Either or both the eye-like stop or the eye-like retainer may provide floatation and/or additional casting weight to the lure. The eye-like stop and/or the eye-like retainer may have an interior cavity sealed to prevent water from entering the cavity. Any desired buoyancy may be achieved by varying the size of the sealed cavity in either the stop or the retainer relative to the overall weight of the fishing device.

As another feature of the present invention, a plurality of very small balls may be provided within the cavity of the stop or retainer. These balls make a small amount of noise as the fishing device is pulled by the line through the water, which attracts fish. The stop and retainer of the present invention are thus able to serve multiple functions, namely to properly secure the pliable lure body on the hook, to provide the lure with additional buoyancy, to assist in attracting the fish to the lure by shaping the stop and retainer to look like matching eyes of a lure, and to make noise as the lure is pulled through the water.

These and other features, objects and advantages of the present invention will become apparent from the following detailed description, wherein reference is made to the figures in the accompanying drawings.

DESCRIPTION OF PREFERRED EMBODIMENTS

Figure 1:
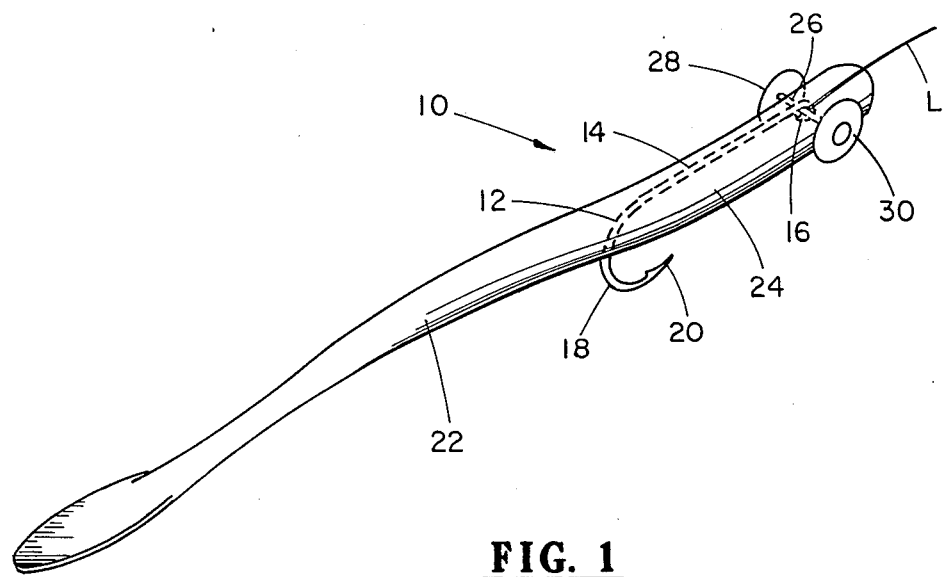
FIG. 1 is a pictorial view of an improved fishing lure according to the invention.

Referring to FIG. 1, the fishing device 10 of the present invention is shown attached to a conventional fishing line L. Fishing line L may be fastened to a hook in a conventional manner either directly or by way of a steel leader. The device 10 is of the type comprising a conventional fishing hook 12 having a generally straight shank portion 14 having a central axis, and with a hook eye 16 at one end thereof for securing to the fishing line L. The other end of the shank portion may be bent to form the curvilinear portion 18 of the hook, which terminates with a conventional barb 20. A pliable fishing lure body 12, which may be manufactured from synthetic or natural rubber or plastic, is shown covering at least a portion of the shank of the hook adjacent the hook eye. The body 12 may take the form of a worm, lizard, insect, or other object to which fish are attracted.

In the conventional fashion, the hook is pushed or "threaded" through the body of the lure to partially or totally conceal the presence of the hook, as shown in FIG. 1. With the lure body 22 positioned at its desired location relative to the hook and with at least a portion 24 of the lure body radially enclosing at least a portion of the hook 12, a rigid pin member 26 having a stop 30 rigidly attached at one end thereof may be pushed through the lure body in a direction generally radial to the axis of the shank, through the eye of the hook, and out the opposing side of the lure body. The stop 30 serves as both a handle for manipulating the pin member 26 through the lure body, and as a stop when engaging the lure body. A retaining means 28 may then be attached to the pointed or free end of the pin member to secure the pin member in place, and to thereby secure the lure body relative to the hook.

Figure 2:
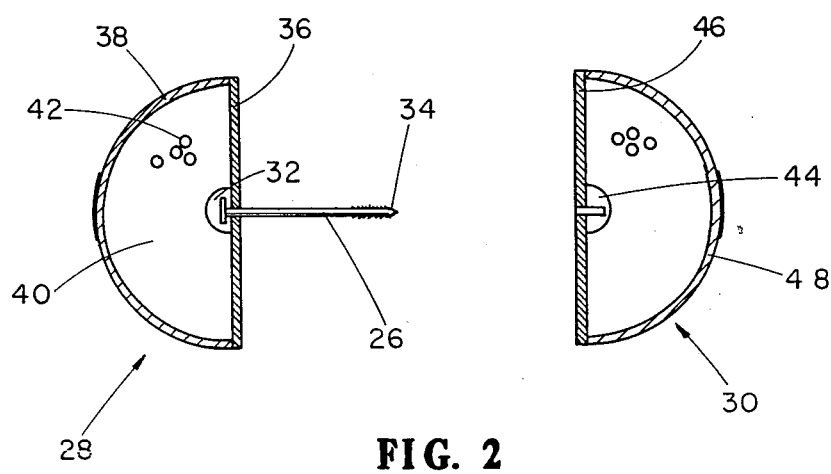
FIG. 2 is an expanded pictorial view, partially in cross-section, of a lure securing device generally shown in FIG. 1.

Referring now to FIG. 2, further details relative to the construction of a suitable retaining device are shown in greater detail. The pin member 26 is preferably a small diameter metallic rod-like member having a head portion 32 at one end thereof, and having a free end or pointed end 34 at the other end. The base 33 of the head portion preferably is flat for planar sealing engagement with backing plate 36. The pin 26 may thus be passed through an aperture provided in the backing plate 36, and a small amount of adhesive may be used to secure the pin 26 to the packing plate 36 in a watertioht manner. The backing plate 36 and head portion 32 of the pin member may be fabricated from any suitable material, such as plastic or metal.

A semi-spherical hollow outer shell member 38 is provided having a circular-shaped surface for sealed engagement with the perimeter of circular plate 36. Shell marker 38 may be sealed to plate 36 by glue, ultrasonic welding, or by a tight "snap fit" connection. A hollow cavity 40 is thus formed in the interior between the shell 38 and the plate 36, thus providing a watertight cavity for receiving a plurality of "BB's" or similar small ball members which independently move within the cavity 40 and thereby make noise when the lure is pulled through the water.

The retaining means 30 comprises a backing plate 46 having a sleeve member 44 secured thereto or molded as part of the plate 46. Sleeve member 44 has a central passageway for temporarily receiving the free end of pin member 26, with the end of the sleeve opposite the plate being closed to fluid flow. An outer shell member 48, preferably also having a semi-spherical configuration, is secured to the perimeter of circular plate 46, and forms a water-tight enclosure for receiving additional independently movable ball members 42. If desired, the length of the sleeve portion 44 may be selected such that it contacts or is closely adjacent the outer shell 48 for providing additional strength to the shell 48 and preventing its collapse.

Pin member 26 can be removably attached to the sleeve portion 44, thereby temporarily attaching the retaining means 30 to the pin member. This temporary and renewable connection between the retainer 50 and the pin may be made by a press fit between the pin member 26 and the sleeve member 44, by threads provided on the pin member (using a slightly undersized passageway diameter in the plastic sleeve member), or by making a portion of the sleeve member of biased metal (in a manner similar to a pierced earring retainer).

As shown in FIG. 2, a portion of the pin member 26 may be ribbed to better enable the securing means 44 to grasp the pin member 26.

It may be understood from the above that either or both the stop means 28 or the retaining means 30 provides a chamber sealed from the water which traps air or other gas in the chamber and thus provides buoyancy to the fishing lure. An advantage of this feature of the present invention is that the buoyant force is located at a desired spot, namely adjacent the end of the fishing lure which represents the "head" of the lure. In this manner, the head end of the lure will generally be at a position higher in the water than the tail end of the lure, which is the desired position for the lure when moving in the water. The elements 42 in this sealed cavity each move independently of other elements, and create noise as the fishing lure is moved through the water, thereby also attracting fish. Ball elements 42 may be fabricated from metal, plastic, or glass.

As shown in FIG. 2, the position of the free end of the pin member 26 is axially movable within the sleeve member 44. Adjustable positioning of the stop relative to the retainer thus allows the securing device to accommodate lure bodies of varying thicknesses at the position adjacent the hook eye, so that both the stop 28 and the retainer 30 can be placed in engagement with the lure body, as shown in FIG. 1.

The stop and the retainer, being preferably geometrically similar and equivalent in size, may thus be configured to represent protruding "eyes" of a lure. So that these "eyes" may be positioned closely adjacent the lure body, the facing surfaces of the stop and retainer are preferably planar and parallel, or may be slightly concave to partially "enclose" the lure body. The length of the pin member 26 is thus preferably selected so that both the retainer and stop are in engagement with the fishing lure body when the securing device is affixed to the lure body and hook.

It should be understood that the stop portion 28 and the retainer 30 may be identical in design and configuration, with the pin member 26 not having a head portion, but simply being an elongate rod-like member. In this embodiment, one retainer may be temporarily secured to one end of the rod-like member, and thereafter may serve as the stop member previously described. When detaching the lure body from the hook, either eye-like retainer may then be removed and the pin member subsequently removed. This embodiment also has the advantage of redundancy, since one retainer could "fail" in a fixed position on the pin member, while the other retainer could then be selectively removed and reattached in the manner previously described.

Both the stop means 28 and the retaining means 30 of the securing device for the lure of the present invention preferably have a similar geometric outer configuration, which is preferably a semi-spherical or partial-spherical configuration In this manner, each of the stop means or retaining means can easily be made to resemble the protruding eyes of the lure, and accordingly may be painted as shown in FIG. 1 with pupil portions.

As a further embodiment of the present invention, either or both of the stop means 28 and the retaining means 30 may be fabricated from a cellular material, such as styrofoam. The rigid pin member 26 can either be press fitted, glued, or threaded to the retaining means. The natural cellular material thus provides buoyancy to the lure as described above.

Although the invention has been described in terms of the specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. An improved fishing device of the type including a metallic hook with an eye at one end of its shank for attaching a fishing line to the hook, and a pliable lure body for attracting fish and enclosing at least a portion of the hook shank, the improvement comprising:

a rigid metallic pin member for passing substantially radially with respect to an axis of the hook shank through a portion of the fishing lure body, thence through the hook eye, and thence through an opposing portion of the fishing lure body for restricting movement of the fishing lure body along the hook shank;

stop means rigidly attached to one end of the pin member for providing a handle when passing the pin member through the fishing lure body, and for preventing an end portion of the pin member adjacent the stop means from passing through the lure body and the hook eye;

removable retaining means for selectively attaching and detaching from an opposing end of the pin member to prevent removal of the pin member from the hook eye when attached to the pin retaining means and for enabling removal of the pin member from the hook eye when detached from the retaining means;

the stop means and the removable retaining means having a similar geometrical configuration; and one or more of the stop means and the retaining means defining a selectively-sized water-tight enclosure for housing a gas to obtain a desired buoyancy for the fishing device in water.

2. An improved fishing device as defined in claim 1, further comprising:

a plurality of independently movable bead members housed within the water-tight enclosure for making noise and attracting fish as the device moves in the water.

3. An improved fishing device as defined in claim 2, wherein each of the bead members are formed from a material selected from a group consisting of glass, plastic or metal.

4. An improved fishing device as defined in claim 1, wherein the retaining means is axially positionable on the pin member such that the stop means and the retaining means may each be placed in engagement with a varying thickness of the pliable lure body.

5. An improved fishing device as defined in claim 1, wherein the length of the pin member is selected such that both the retaining means and the stop means are each in engagement with the fishing lure body.

6. An improved fishing device of the type including a metallic hook with an eye at one end of its shank for attaching a fishing line to the hook, and a pliable lure body for attracting fish, the improvement comprising:

a rigid pin member for passing through a portion of the fishing lure body;

stop means secured to an end of the pin member for preventing the pin member from passing through the lure body;

retaining means for selectively attaching and detaching from an opposing end of the pin member to prevent removal of the pin member from the lure body when attached to the retaining means and for enabling removal of the pin member from the lure body when detached from the retaining means; and one or more of the stop means and the retaining means defining a selectively-sized water-tight enclosure for housing a gas to obtain a desired buoyancy in water for the fishing device.

7. An improved fishing device as defined in claim 6, further comprising:

a plurality of independently movable bead members housed within the water-tight enclosure for making noise and attracting fish as the device moves in the water.

8. An improved fishing device as defined in claim 6, wherein the stop means and the retaining means have a similar outer geometrical configuration.

9. An improved fishing device as defined in claim 6, wherein the retaining means includes the sleeve-like member for receiving and removably attaching and detaching the pin member to the retaining means.

10. An improved fishing device as defined in claim 6, wherein both the stop means and the retaining means each define the water-tight enclosure for housing air to obtain a desired buoyancy for the fishing device in water.

11. An improved fishing device as defined in claim 6, wherein the retaining means includes the sleeve-like member for receiving and removably attaching and detaching the pin member to the retaining means.

12. An improved fishing device as defined in claim 6, wherein each of the stop means and retaining means includes a substantially planar plate for engagement with the lure body.

13. An improved fishing device as defined in claim 6, wherein the stop means is rigidly and permanently affixed to the end of the pin member.

14. An improved fishing device as defined in claim 6, wherein the length of the pin member is selected such that both the retaining means and the stop means are each in engagement with the fishing lure body.

15. An improved fishing device as defined in claim 8, wherein each of the stop means and the retaining means has a generally semi-spherical configuration.

16. An improved method of forming a fishing device of the type including a metallic hook with an eye at one end of its shank for attaching the fishing line to the hook, and a pliable lure body for attracting fish and enclosing at least a portion of the hook shank, the method comprising:

pushing a rigid metallic pin member substantially radially with respect to an axis of the hook shank through a portion of the fishing lure body, thence through the hook eye, and thence through an opposing portion of the fishing lure body for restricting movement of the fishing lure body along the hook shank;

pressing a stop rigidly attached to an end of the pin member in engagement with the fishing lure body;

selectively attaching a retainer to an opposing end of the pin member to prevent removal of the pin member from the eye of the hook; and providing a water-tight enclosure within one or more of the stop and the retainer for housing gas to obtain an desired buoyancy of the fishing device in water.

17. The method as defined in claim 16, further comprising:

providing a plurality of independently movable beads within the water-tight enclosure for making noise and attracting fish as the device moves in the water.

18. The method as defined in claim 16, further comprising:

adjusting the position of the retainer with respect to the pin member such that both the retainer and the stop are in contact with the fishing lure body.

* * * * *